(12) United States Patent
Frazier et al.

(10) Patent No.: US 9,811,397 B2
(45) Date of Patent: *Nov. 7, 2017

(54) DIRECT APPLICATION-LEVEL CONTROL OF MULTIPLE ASYNCHRONOUS EVENTS

(71) Applicant: International Business Machines Corporation, Armonk, NY (US)

(72) Inventors: Giles R. Frazier, Austin, TX (US); Michael Karl Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,354

(22) Filed: Nov. 2, 2015

(65) Prior Publication Data

US 2017/0102964 A1 Apr. 13, 2017

Related U.S. Application Data

(63) Continuation of application No. 14/876,950, filed on Oct. 7, 2015.

(51) Int. Cl.

| G06F 13/00 | (2006.01) |
| G06F 3/00 | (2006.01) |
| G06F 9/44 | (2006.01) |
| G06F 9/46 | (2006.01) |
| G06F 9/54 | (2006.01) |
| G06F 9/48 | (2006.01) |

(52) U.S. Cl.
CPC ............ *G06F 9/542* (2013.01); *G06F 9/4818* (2013.01)

(58) Field of Classification Search
CPC ...................................................... G06F 9/542
USPC ........................................................ 719/318
See application file for complete search history.

(56) References Cited

U.S. PATENT DOCUMENTS

| 5,774,724 A * | 6/1998 | Heisch ................ G06F 11/3409 |
| | | 714/E11.192 |
| 8,904,392 B2 * | 12/2014 | Chiu .................... G06F 11/3409 |
| | | 718/100 |
| 2006/0294347 A1 * | 12/2006 | Zou ........................ G06F 9/3009 |
| | | 712/244 |

(Continued)

OTHER PUBLICATIONS

Zanella, Adhemerval. "Event Based Branching Overview, ABI, and API". GitHub. https://github.com/paflib/paflib/wiki/Event-Based-Branching—Overview,-ABI,-and-API. Oct. 8, 2013. (8 pages).

(Continued)

*Primary Examiner* — Timothy A Mudrick
(74) *Attorney, Agent, or Firm* — Patterson + Sheridan, LLP

(57) ABSTRACT

Methods for enabling an application-level direct control of multiple facilities are disclosed herein. In one embodiment, the method includes reading, by operation of an application-level handler, a register configured to store status information and control information associated with a plurality of facilities, wherein a facility is a process running independently from a processor, determining an order of priority for events in the register based on the status information and control information of the multiple facilities, and processing the events in the order of priority such that an application can directly control the multiple facilities simultaneously.

8 Claims, 7 Drawing Sheets

(56) References Cited

U.S. PATENT DOCUMENTS

2009/0164852 A1* 6/2009 Purrington .............. G06F 1/206
　　　　　　　　　　　　　　　　　　　　　714/48
2013/0151837 A1　　6/2013 Frazier et al.
2013/0332778 A1　12/2013 Spracklen
2014/0089946 A1　　3/2014 Frazier et al.
2016/0041852 A1* 2/2016 Suarez Gracia ...... G06F 1/3296
　　　　　　　　　　　　　　　　　　　　　713/323

OTHER PUBLICATIONS

IBM "List of IBM Patents or Patent Applications Treated as Related".

U.S. Appl. No. 14/876,950, entitled Direct Application-Level Control of Multiple Asynchronous Events, filed Oct. 7, 2015.

* cited by examiner

DIRECT APPLICATION-LEVEL CONTROL OF MULTIPLE ASYNCHRONOUS EVENTS

CROSS-REFERENCE TO RELATED APPLICATION

This application is a continuation of co-pending U.S. patent application Ser. No. 14/876,950, filed Oct. 7, 2015. The aforementioned related patent application is herein incorporated by reference in its entirety.

BACKGROUND

1. Field of the Invention

The present disclosure relates to processing systems and processors, and more specifically to techniques for sharing a set of controls to enable an application to control multiple facilities of a processing system.

2. Description of Related Art

Many processors have facilities, such as a performance monitoring facility, built into the hardware for tracking various performance characteristics such as instructions executed, cache misses, processor stalls, and other performance related events. The facilities may be highly secure and may be accessible by an operating system under a privileged execution level. The operating system utilizes this access to assist in determining the performance of the processor under certain conditions. The operating system may provide such performance information to certain software applications upon demand such as by system calls or other signals. However, due to the secure nature of the information, the operating system will only provide such performance information to an application so long as the security of that information is maintained. For example, an operating system should not provide performance information of a processor when it is being utilized by one application to a different application.

SUMMARY

Embodiments of the present disclosure provide methods for managing access to hardware units or facilities of a processor or processing system. An application-level handler reads a register configured to store status information and control information associated with a plurality of facilities. A facility is a hardware unit running independently from a processor. The application handler determines an order of priority for events in the register based on the status information and control information of the multiple facilities, and processes the events in the order of priority such that an application can directly control the multiple facilities simultaneously.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

For clarity, identical reference numerals have been used, where applicable, to designate identical elements that are common between figures. Additionally, elements of one embodiment may be adapted for use with other embodiments.

DETAILED DESCRIPTION

Figure 1:
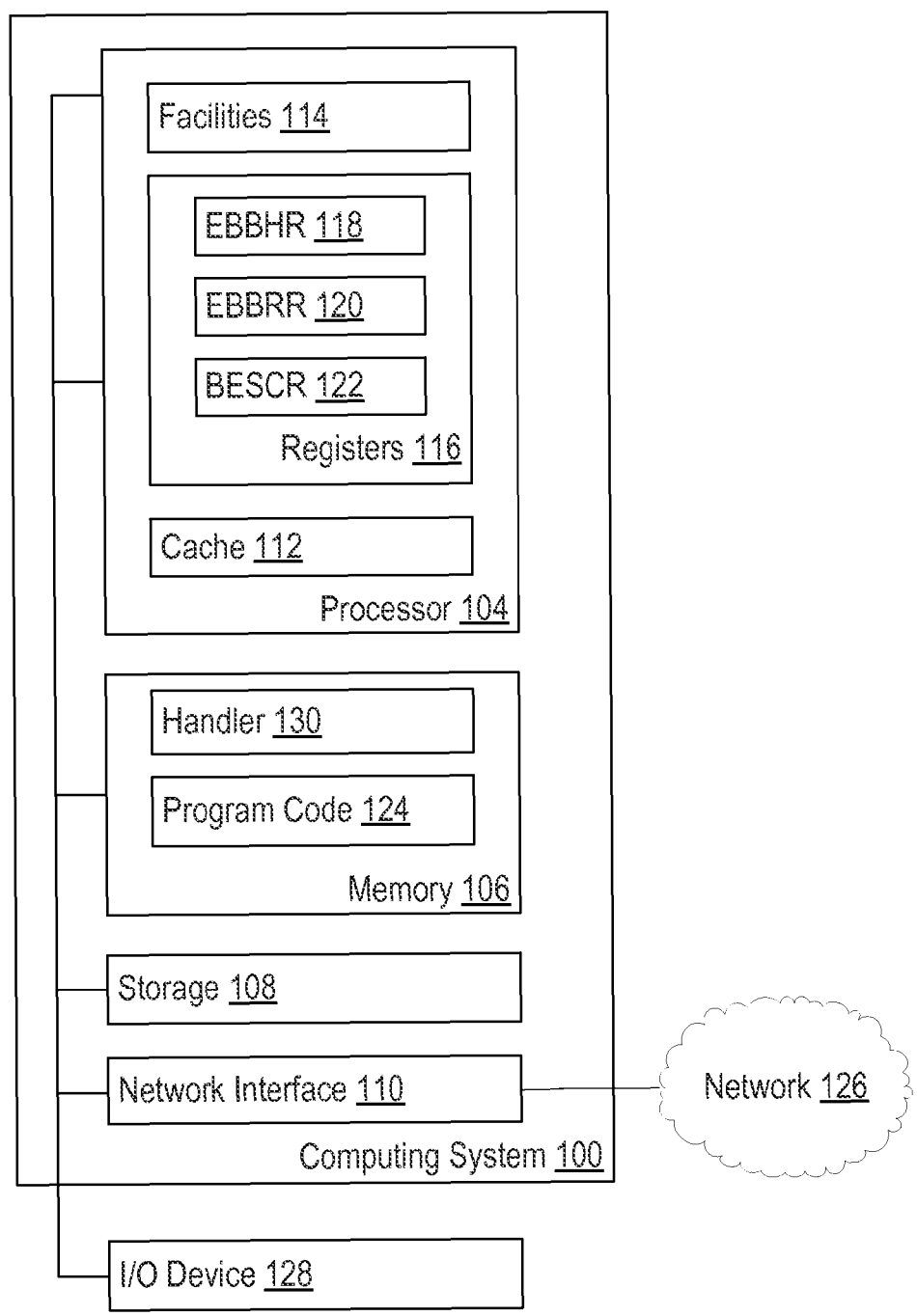
FIG. 1 is a block diagram illustrating a computing system, according to one embodiment disclosed herein.

FIG. 1 is a block diagram illustrating a computing system 100, according to one embodiment disclosed herein. The computing system 100 includes a processor 104, memory 106, storage 108, and a network interface 110. The processor 104 retrieves and executes programming instructions stored in memory 106 as well as stores and retrieves application data residing in the cache 112. The processor 104 is included to be representative of a single processor, multiple processors, a single processor having multiple processing cores, and the like. The storage 108 may be a disk drive storage device. Although shown as a single unit, the storage 108 may be a combination of fixed and/or removable storage devices, such as fixed disk drives, removable memory cards, optical storage, network attached storage (NAS), or storage-area-network (SAN). The network interface 110 may be any type of network communications allowing the computing system 100 to communicate with other computers via a network 126. The computing system 100 also includes an I/O device 128 (e.g. keyboard and mouse devices) connected to the computing system 100.

The processor 104 includes one or more hardware facilities 114, which are hardware sub-units or sub-systems that are configured to perform one or more specialized processor-related tasks. Each hardware facility 114 can be comprised of special-purpose hardware registers, counters, events, controls, and instructions for performing the designated task of the hardware facility. The processor 104 may include one or more hardware facilities that facilitate or monitor operations of the processor 104 (e.g., performance monitor), as well as one or more hardware facilities 114 that perform or monitor facilities that are independent of the processor 104. One example of a facility that monitors operations of a processor is a processor performance monitor facility, configured to track various performance characteristics such as instructions executed, cache misses, processor stalls, and other performance related events. An example of a facility that monitors events independent of the processor is an event reception facility that monitors or controls events unrelated to processor execution, such as incoming signals from other processors or devices. For simplicity of explanation, the hardware facilities may be referred to hereinafter as facilities 114.

As today's application programs increase in capability, the application programs have become capable of performing a wider variety of tasks once performed only by a privileged program such as an operating system. Such tasks include interacting with programs executing on other processors, monitoring the performance of the processor, performing optimizations based on performance data, and response to and controlling facilities external to the processor. Many of such tasks can require real-time responses to input signals which may become active asynchronously at random times, so there is little to no time for higher-level software (e.g., operating system) to become involved. Thus, the events have to be routed directly to the application as the events occur, even in cases where multiple events occur all at the same time.

Accordingly, embodiments of the present disclosure provide a streamlined and scalable method that enables an application to simultaneously control multiple sets of asynchronous events, any of which may occur at any time or all at the same time. Embodiments of the present disclosure provide a scheme to provide the application with the ability to postpone the handling of less critical in favor more-critical events as well as process all tasks individually as the events occur if desired.

In contrast to other approaches that use dedicated hardware for handling a single facility, the processor 104 includes a single set of hardware and controls that enable an application program to control multiple facilities 114 and their associated asynchronous events. The described embodiments eliminate any need to implement a separate set of control logic for each type of event (for each facility) to be handled. The described embodiments also enable the control program to selectively process critical events with higher priorities, indefinitely postpone the handling of any event or set of events, or handle non-critical events on an as-available basis. Allowing the application to control the priority of event handling not only eliminates any need for any hardware priority logic, but also enables the application to optimize the order and urgency in which the application handles events to obtain maximum performance.

In one embodiment, the processor 104 includes one or more application-level registers 116 configured to store parameters for controlling the operation and access to the facilities 114. In some embodiments, the registers 116 contain various types of fields or bits for providing information about the operation of the facilities 114 and for managing the operation of the facilities 114 including restarting the facilities 114.

In one embodiment, the registers 116 include an event-based branch handler register (EBBHR) 118, an event-based branch return register (EBBRR) 120, and a branch event status and control register (BESCR) 122. Other registers may be located within the set of registers, and the registers shown may be located elsewhere in the processor 104. Alternative embodiments may utilize different types of registers to implement the functionality described herein. The EBBHR 118 contains the address of the application-level routine that is capable of handling asynchronous events of all types in real-time as they occur. Responsive to event-based branches (EBBs) being enabled and any enabled event occurring, the processor 104 performs an event-based branch (EBB), which asynchronously transfers control, or branches, from the application routine into a handler routine. Responsive to the EBB occurring, hardware loads the EBBRR 120 with an address of an instruction in the application that was executing when control was transferred to the handler when the event occurs. The BESCR 122 contains control and status fields for any set of multiple facilities. The BESCR 122 is shown in more detail in FIG. 2.

Figure 2:
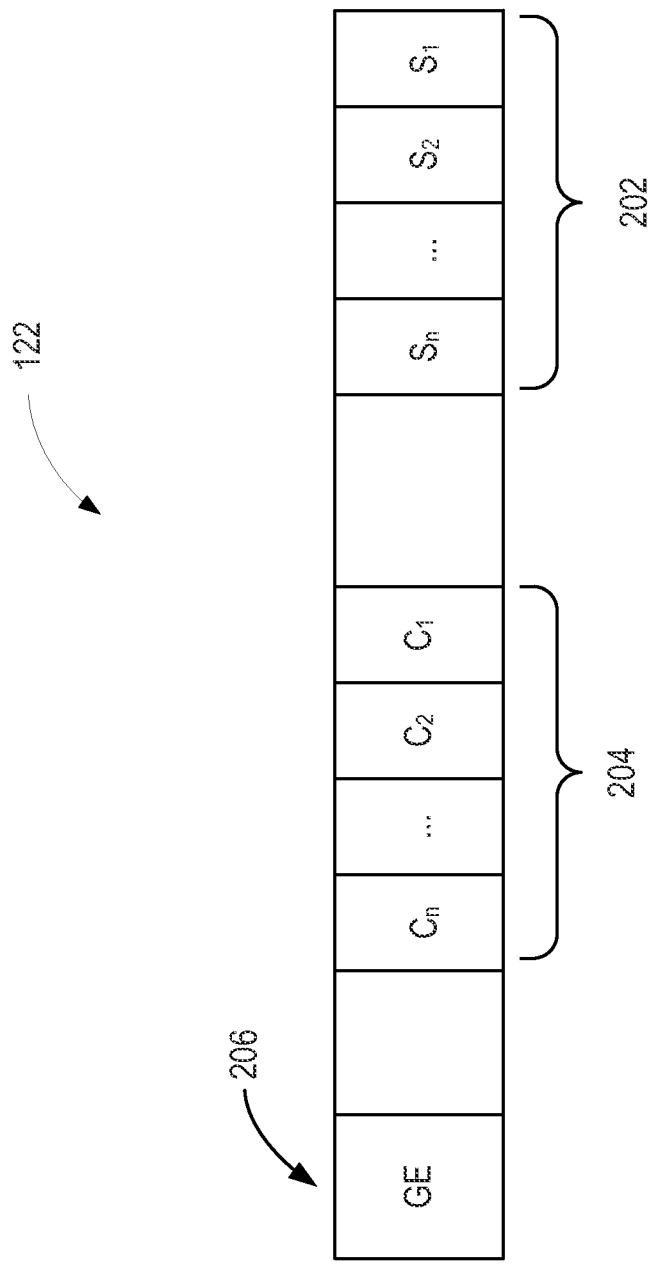
FIG. 2 is a block diagram illustrating a branch event status and control register from FIG. 1, according to one embodiment disclosed herein.

FIG. 2 is a block diagram illustrating the branch event status and control register (BESCR) 122, according to one embodiment disclosed herein. The BESCR 122 includes a plurality of status fields (Sn) 202. In an embodiment having "n" facilities, each status field 202, Sn . . . S1, corresponds to status information pertaining to facilities 1 through n. Status fields 202 may be defined in any way applicable to the facility, including fields containing multiple bits that pertain to different events or states of the facility, a single binary number indicating that a specific event has occurred or state exists for the facility, or in any other way that is needed to describe the current state of the facility and events that have occurred. Such information may include information coming from other programs executing on different processors, from external sensors and controllers, from sensors monitoring access to various regions of memory, and the like. This information can also include urgency indicators, as well as any other information that may be required to control the facilities 114. All status fields 202 Sn contain at least one "exception-occurred" indicator. Each exception-occurred indicator for a facility is set by the processor 104 whenever an event corresponding to the facility has occurred.

The BESCR 122 further includes a plurality of control fields (Cn) 204. Control field 204 Cn corresponds to controls for facility n, where facility n is one of the facilities in the plurality of facilities. As in the case of the status fields 202, control fields 204 can be defined in any suitable way to the facility, including single-bit fields that enable the facility to cause additional events, multi-bit fields, or fields containing binary numbers that direct the facility in various ways. Each facility n can include an exception-enable field that enables the facility to cause an exception. In one implementation, when an exception occurs, the processor 104 will set the exception-occurred indicator in the status field to 1, and the exception-enable field bit is set to 0. This prevents any events from the facility from causing additional exceptions before the first event has been processed by software.

In one embodiment, the BESCR 122 further includes a global enable (GE) field 206. The global enable field 206 controls whether event-based branches can occur, thereby causing program control to be redirected to the handler. If the global enable field 206 is set to 0, then no event-based branches can occur. If the global enable field 206 is set to 1, event-based branches will occur whenever any exception-occurred bit is set to 1. When any event occurs, the global enable field 206 is set to 0 to disable additional event-based branches. This enables the handler to process events without interruption caused by additional event-based branches. While the BESCR 122 provides basic controls of events related to a facility, there may also be facilities with additional status and control information accessible in other ways in addition to the BESCR 122. Facilities such as these, however, would continue to make use of the exception-enable and exception-occurred fields described above in order to enable the application to control the event-based branches resulting from the facility. Additionally, for some or all facilities, there may be an operating system level control with which the operating system grants control of various aspects of a facility to an application. When this is the case, there may also be an application program interfaces (APIs) that enable the application to use a particular facility, and procedures for using the API.

Referring back to FIG. 1, the memory 106 includes program code 124 instructions for application(s) and a handler 130. The handler 130 processes exceptions from facilities 114. Some of these program code instructions may be a return from event-based branch (rfebb) instruction. The rfebb instruction may be used at the end of the handler, which, when executed by the processor, transfers control back to the application. The rfebb instruction loads a program counter with the contents of the EBBRR 120, which was set by hardware to point to the instruction that was executing when the event occurred. An operand of the rfebb instruction enables the application to cause the rfebb instruction to set the global enable field to 1, allowing additional event-based branches to occur, or leave the global enable bit at 0.

Figure 3:
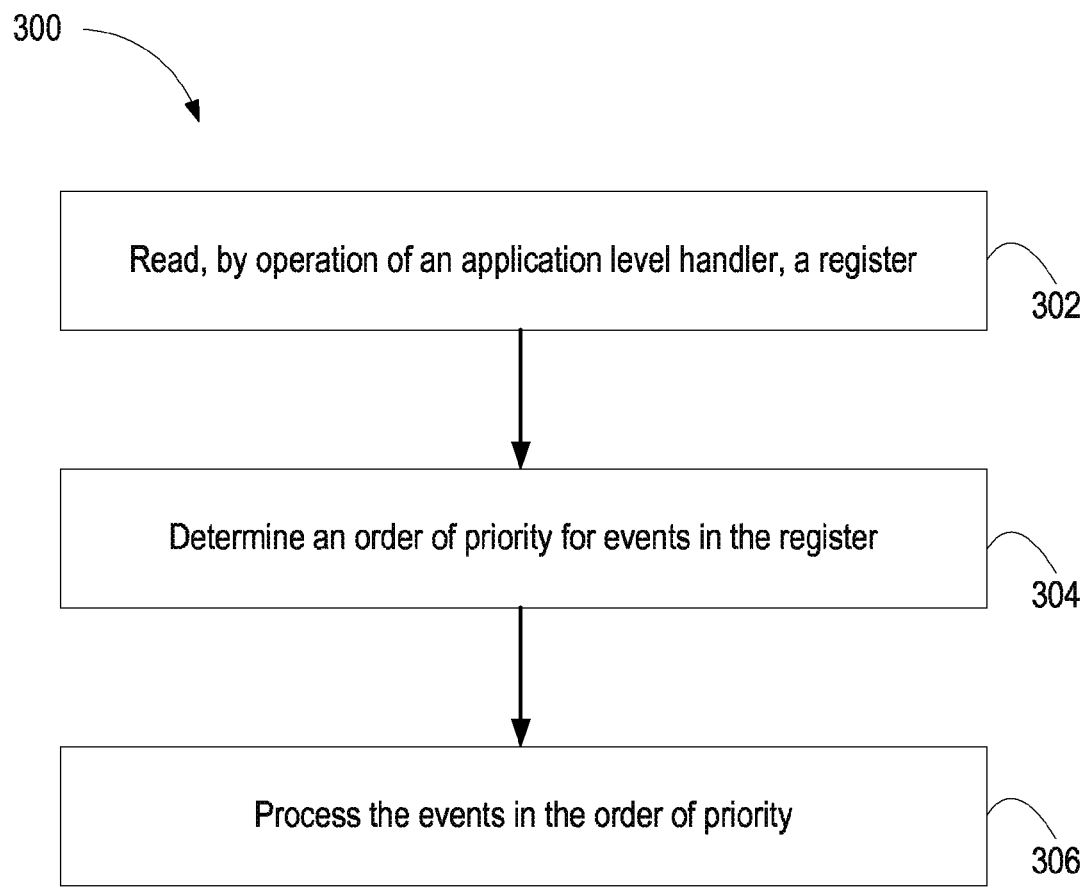
FIG. 3 is a flow diagram illustrating a method for enabling an application direct control of multiple facilities, according to one embodiment disclosed herein.

FIG. 3 is a flow diagram illustrating a method 300 for enabling an application direct control of multiple facilities, according to one embodiment. The method 300 begins at step 302. At step 302, an application-level handler reads a register. For example, the handler reads the BESCR to determine the set of exceptions that caused the event-based branch. If a particular facility caused the exception, then the processor 104 set that facility's status bit, Sn, in the BESCR to 1 and its control bit, Cn, to 0.

At step 304, the handler determines an order of priority for events in the register. Because the events that cause event-based branches may include a wide variety of event types, all of which may happen simultaneously, the provided BESCR enables the handler (e.g., as configured by a programmer of the handler) to create the order of priority and handle the "more critical" events first. For example, critical events may include an exception that occurred during the execution of an instruction. "Less critical" events (e.g. non-critical signals from other processors or devices) may be handled in order of importance before exiting the handler, may be put off until the occurrence of another event, or put off indefinitely until the application has no other tasks to perform.

In some embodiments, the order of priority for events in the register may be determined based on the state of the BESCR and based on the program instructions implementing the handler, as set by the programmer. For example, the handler might be programmed to first check the status and control fields of the BESCR corresponding to a facility pre-designated as having high-priority events (e.g., to handle exceptions caused during an execution of an instruction immediately before returning), and then, subsequently check the status and control fields of the BESCR corresponding to another facility pre-designated as having lower relative priority events (e.g., for performance monitor exceptions that can be handled at some time in the future).

At step 306, the handler processes the events in the order of priority determined in step 320. For example, the handler may process an application's usage of a performance monitor for tasks such as "just in time" compiling, monitoring of memory accesses for application such as garbage collection and compaction, floating point or other execution unit exception handling, receipt of messages from other processors, or any asynchronous event in the order most suitable to the current environment.

Figure 4:
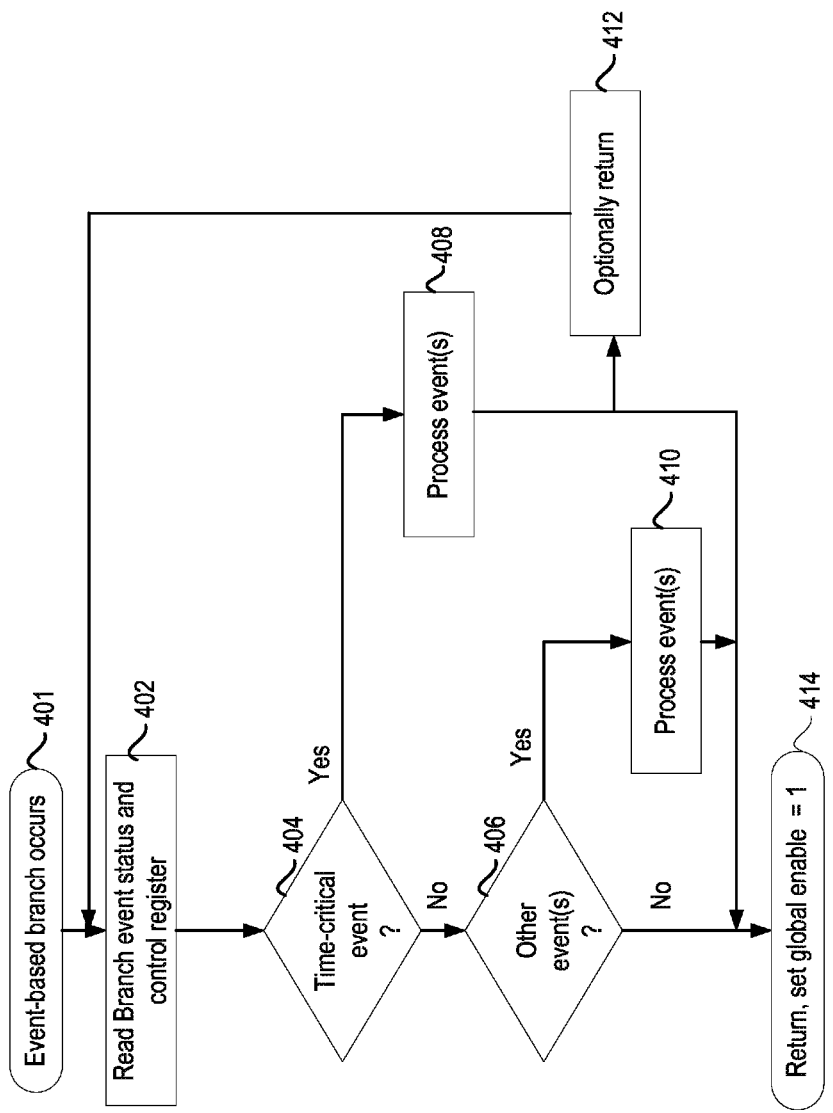
FIG. 4 is a flow diagram illustrating a method for enabling an application direct control of multiple facilities, according to one embodiment disclosed herein.

FIG. 4 is a flow diagram illustrating a method 400 for enabling an application direct control of multiple facilities, according to one embodiment disclosed herein. The method begins at step 401 when an event-based branch occurs. For example, the event-based branch may be caused by a counter overflow signal. The event-based branch at step 401 triggers the handler to read the BESCR at step 402 to determine the set of exceptions that caused the event-based branch. If a particular facility caused the exception, then its status bit, Sn, in the BESCR will have been set to 1 and its control bit, Cn, will have been set to 0.

At decision block 404, the handler determines if there are any time-critical events that caused the event-based branch. If, the handler determines that there are time-critical facilities that caused the event-based branch, then the Sn bits corresponding to those facilities will have been set to 1. If such a critical event(s) has occurred, at step 408, the handler processes the critical event(s), including re-enabling the facilities to cause additional exceptions by resetting the exception-occurred field, and setting the exception-enable field to 1. After step 408, the handler may be exited, and the handler will re-enable the global enabled field by executing the rfebb instruction at step 414. Alternatively and depending on the importance of the critical event, at step 412, the handler may revert to step 402 in order to check if additional events have occurred.

If, at decision block 404, the handler determines that there are not any time-critical events, at step 406, the handler determines whether there are any other events that need to be processed. If there are no other events that need to be processed, then at step 414, the handler will exit the routine, and re-enable the global enable bit by executing the rfebb instruction. If there are other events that need to be processed, then at step 410 the handler processes the events, and re-enables the facilities to cause additional exceptions. The handler re-enables the facilities by resetting the exception-occurred field, and setting the exception-enable field to 1. After step 410, the handler may be exited, and the handler will re-enable the global enabled field by executing the rfebb instruction at step 414.

The above procedure is only one possible embodiment of an event-based branch handling routine. Other handlers could be used that process events in different order of priority, that selectively re-enable some facilities while disabling others, that use additional control and status information available from a particular facility, and the like. This level of control over each supported facility enables the routine to be applied to a wide range of facilities simultaneously without constraints imposed by hardware control over priority.

Figure 5:
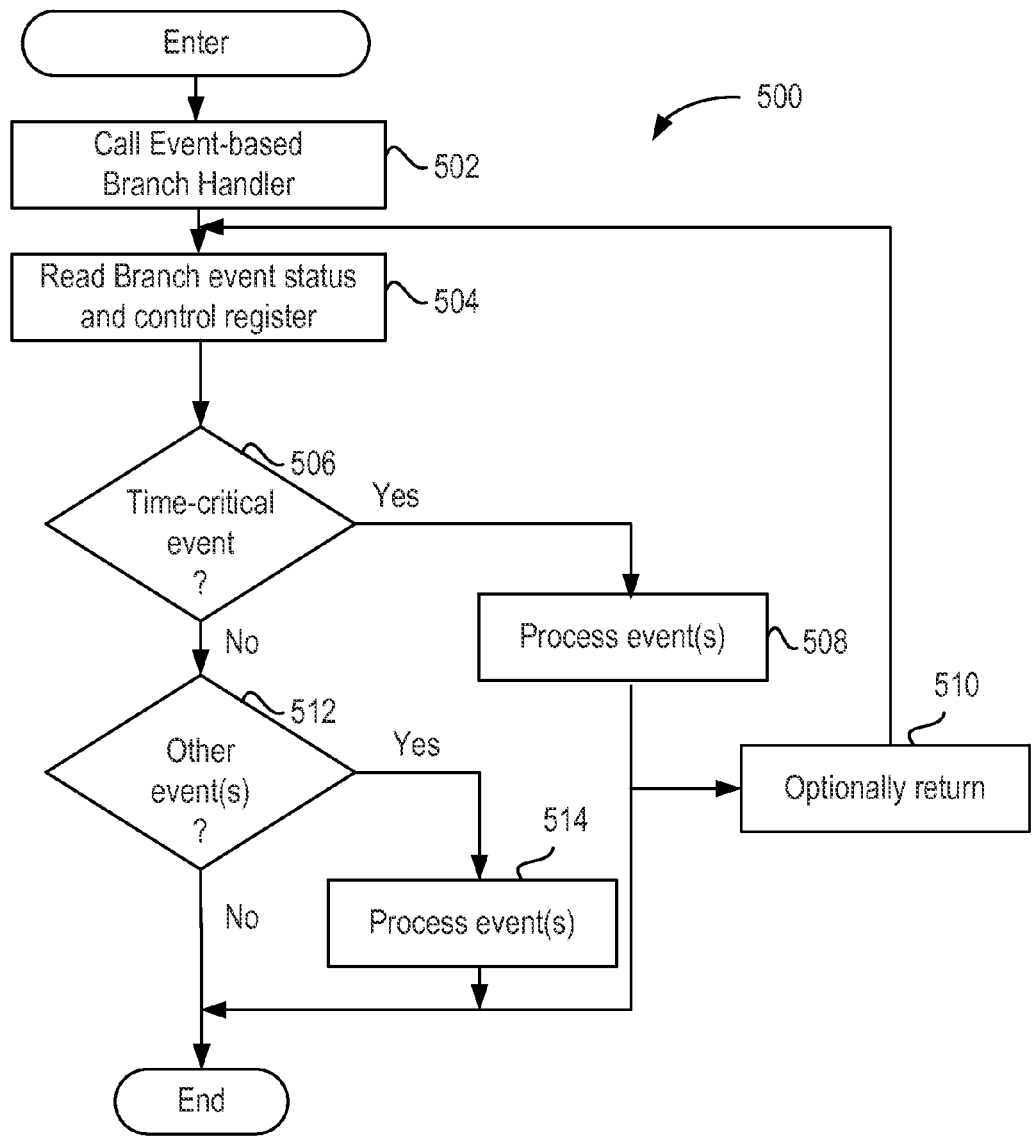
FIG. 5 is a flow diagram illustrating a method for enabling an application direct control of multiple facilities, according to one embodiment disclosed herein.

FIG. 5 is a flow diagram illustrating a method 500 for enabling an application direct control of multiple facilities, according to one embodiment disclosed herein. In some situations, embodiments of the present disclosure may be extended to poll for events associated with facilities controlled instead of using event-based branches. For example, there may not be any time critical events, and the user only wants to check the statuses of the facilities. Because there are no event-based branches to trigger the handler to read the branch event status and control register, at step 502 the routine is entered by executing a call instruction into the handler. This may be done during a polling loop, when a timeout occurs, when there is no other work to be done, or at any other point as needed.

The call instruction at step 502 triggers the handler to read the BESCR at step 504 to determine whether any exceptions have occurred. If a particular facility caused an exception, then its status bit, Sn, in the BESCR will have been set to 1 and its control bit, Cn, will have been set to 0.

At decision block 506, the handler determines if there are any time-critical events that have occurred. If, the handler determines that there are time-critical events that have occurred, then the Sn bits corresponding to those facilities will have been set to 1. If such a critical event(s) has occurred, at step 508, the handler processes the critical event(s), including re-enabling the facilities to cause additional exceptions. The handler re-enables the facilities by resetting the exception-occurred field, and setting the exception-enable field to 1. After step 508, the procedure executes a return instruction and the global enable bit remains at 0. Alternatively, at step 514, the handler may revert to step 504 in order to check if additional events have occurred.

If, at decision block 506, the handler determines that there are not any time-critical events, at step 512, the handler determines whether there are any other events that need to be processed. If there are no other events that need to be processed, the procedure executes a return instruction and the global enable bit remains at 0. Alternatively, at step 514, the handler may revert to step 504 in order to check if additional events have occurred.

If, there are other events that occur, at step 514 the handler processes the events, and re-enables the facilities to cause additional exceptions. The handler re-enables the facilities by resetting the exception-occurred field, and setting the exception-enable field to 1. After step 514, the procedure executes a return instruction and the global enable bit remains at 0. Alternatively, at step 514, the handler may revert to step 504.

The described scheme is not limited in the types of facilities that are controlled, and allows either partial application-level control of full application-level control. For example, some of the facilities 114 controlled by an application may have additional privileged status and control information managed by an operating system (OS). In such cases, the application may need to request and be granted control of a given facility (or a portion thereof) from the OS. A method for requesting and granting control of a facility is described below in conjunction with FIGS. 6-7. Such facilities may include facilities in which granting control of a certain aspect of the facility to an application could pose a potential security exposure. In other embodiments, there may be some facilities 114 that have OS-level controls that allow the OS to control whether events are routed using event-based branches or to interrupts into the OS. One such example is a floating-point exception. Since some floating point exceptions are caused by the actions of the applications (e.g., such as a division by 0), described embodiments can advantageously route some of these exceptions to the application for processing rather than the OS.

Figure 6:
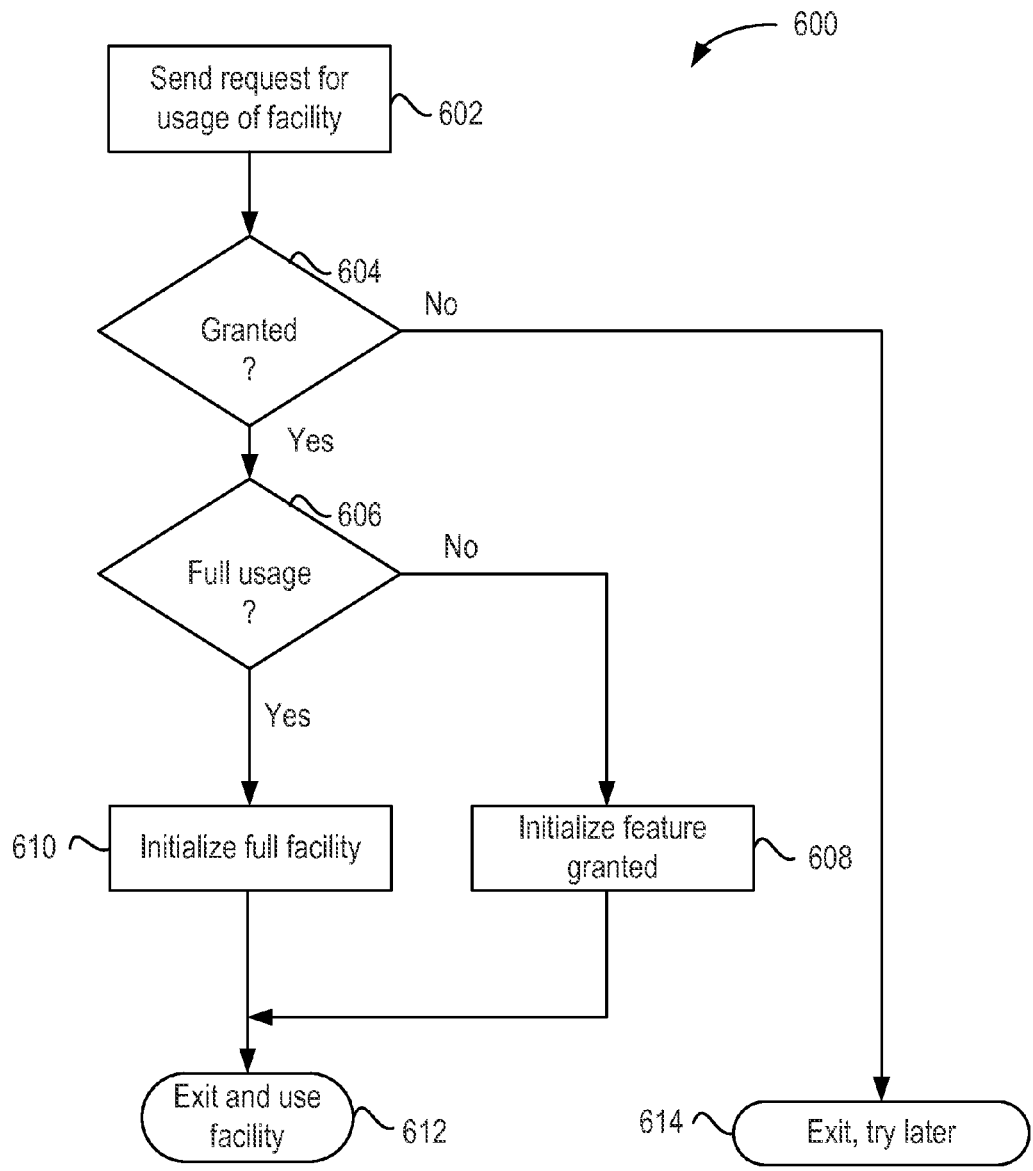
FIG. 6 is a block diagram depicting a procedure by which an application requests usage of a facility, according to one embodiment disclosed herein.

FIG. 6 is a block diagram depicting a method 600 by which an application requests usage of a facility, according to one embodiment disclosed herein. As described above, there may procedures by which the application uses an API to request to have control of a given facility, or part of a given facility, and for the operating system to grant it.

The method 600 begins at step 602. At step 602 the application sends a request for use of a facility. At decision block 604, the operating system either grants the request or denies the request. If the operating system denies the request, then at step 614 the application exits the method 600 and may try again later. If the operating system grants the request, then at step 606 the operating system determines whether the application requested for full usage of the facility.

If, at step 606, the application determines that it has been granted full usage of the facility, then at step 610 the application initializes the entire facility. Initializing the facility includes setting control fields and enabling events related to the facility using a control register, such as the BESCR. At step 612, the application exits the method 600 and uses the facility. If, at step 606, the application determines that it has been granted partial use of the facility, then at step 608 the application initializes those features granted. At step 612, the application exits the method 600 and uses those features of the facility that it has been granted.

Figure 7:
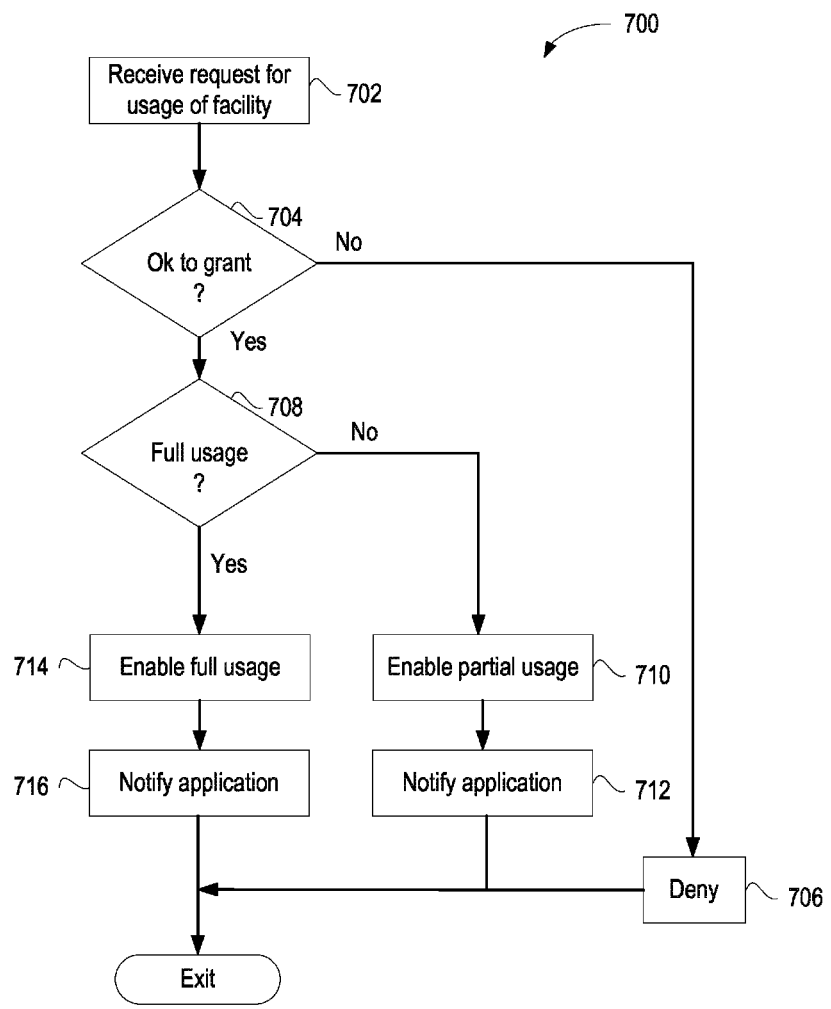
FIG. 7 is a block diagram illustrating a method for an operating system responding to a request from an application to use a facility, according to one embodiment disclosed herein.

FIG. 7 is a block diagram illustrating a method 700 for an operating system responding to a request from an application to use a facility, according to one embodiment disclosed herein. The method begins at step 702. At step 702 the operating system receives a request from the application for use of a facility. At decision bock 704, the operating system determines whether it is able to grant the request. If the operating system is not able to grant the request, then at step 706 the operating system denies the request from the application and exits the method 700. Example scenarios in which the operation is not able to grant use of a facility may include when the facility is already in use, when granting use to the application would cause a security exposure, or when it is inappropriate for the application to control the facility for other reasons.

If the operating system is able to grant the request, then at decision block 708 the operating system determines whether the application requested full usage of the facility. If the application requested full usage of the facility and it is acceptable to grant full usage, then at step 714 the operating system sets the necessary operating system level controls to enable full usage of facility. At step 716, the operating system notifies the application that it enabled full use of the facility, and exits the method. If the application did not request full usage of the facility or if it is acceptable to enable only partial use of the facility, then at step 710 the operating system sets the appropriate operating system level controls to enable partial usage of the facility. The operating system notifies the application at step 712 and then exits the method 700.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., performance monitor) or related data available in the cloud. For example, the program could execute on a computing system in the cloud for enabling an application direct control of multiple facilities. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
    reading, by operation of an application-level handler, the register containing a first plurality of bits storing status information for the plurality of facilities, wherein each of the plurality of facilities corresponds to a respective one or more bits in the first plurality of bits, wherein the register contains a second plurality of bits containing control information for the plurality of facilities, and wherein each of the plurality of facilities corresponds to a respective one or more bits in the second plurality of bits, wherein the status information indicates which facility of the plurality of facilities triggered an exception and the control information indicates whether additional exceptions can occur for the facility until an event that triggered the exception is handled, wherein a facility is a hardware unit running independently from a processor;
    determining an order of priority for events associated with the plurality of facilities based on the status information and control information of the plurality of facilities;
    processing the events in the order of priority such that an application can directly control the plurality of facilities simultaneously.

2. The method of claim 1, further comprising:
    storing, in a second register, an address of the application-level handler; and
    in response to an event-based exception:
        modifying status information stored in the register;
        loading the address of the application-level handler from the second register; and
        transferring control to the application-level handler.

3. The method of claim 1, wherein executing a handler to read a register configured to store status information and control information pertaining to the plurality of facilities, comprises:

triggering an event-based branch to execute the handler to read the register in response to an occurrence of an event.

4. The method of claim 1, wherein executing a handler to read a register configured to store status information and control information pertaining to the plurality of facilities, comprises:
   executing a call instruction to execute the handler to read the register;
   polling the facilities to determine a state of each facility; and
   executing a return instruction to return from the call instruction.

5. The method of claim 1, the status information includes an indicator bit for each facility, wherein the indicator bit is set in response to an occurrence of an event corresponding to the facility.

6. The method of claim 1, wherein the application is granted full usage of a facility by an operating system in response to the application sending a request for full usage of the facility to the operating system.

7. The method of claim 1, wherein the application is granted partial usage of a facility by an operating system in response to the application sending a request for partial usage of the facility to the operating system.

8. A method, comprising:
   reading, by operation of an application-level handler, a register containing a first plurality of bits storing status information for a plurality of facilities comprising at least one facility that monitors operations of the processor and at least one facility that monitors an independent facility that runs independently from the processor, wherein each of the plurality of facilities corresponds to a respective one or more bits in the first plurality of bits, wherein the register contains a second plurality of bits containing control information for the plurality of facilities, and wherein each of the plurality of facilities corresponds to a respective one or more bits in the second plurality of bits, wherein the status information indicates which facility of the plurality of facilities triggered an exception and the control information indicates whether additional exceptions can occur for the facility, wherein a facility is a hardware unit running independently from a processor;
   determining an order of priority for events associated with the plurality of facilities based on the status information and control information of the plurality of facilities;
   processing the events in the order of priority such that an application can directly control the plurality of facilities simultaneously.

* * * * *